(12) United States Patent
Von Der Ohe

(10) Patent No.: US 7,053,335 B2
(45) Date of Patent: May 30, 2006

(54) METHOD AND DEVICE FOR CLEANING WELDING TORCHES

(76) Inventor: Juergen Von Der Ohe, Zechenhausstr. 4 b, 06120 Halle/S. (DE)

( * ) Notice: Subject to any disclaimer, the term of this patent is extended or adjusted under 35 U.S.C. 154(b) by 164 days.

(21) Appl. No.: 10/451,607

(22) PCT Filed: Dec. 14, 2001

(86) PCT No.: PCT/DE01/04730

§ 371 (c)(1),
(2), (4) Date: Aug. 18, 2003

(87) PCT Pub. No.: WO02/49794

PCT Pub. Date: Jun. 27, 2002

(65) Prior Publication Data

US 2004/0050834 A1   Mar. 18, 2004

(30) Foreign Application Priority Data

Dec. 20, 2000 (DE) .................. 100 63 572

(51) Int. Cl.
*B23K 9/32* (2006.01)
*B23K 37/00* (2006.01)
(52) U.S. Cl. .................................... 219/136

(58) Field of Classification Search ............ 219/136, 219/137.43; 451/53
See application file for complete search history.

(56) References Cited

U.S. PATENT DOCUMENTS

| 4,038,786 | A | * | 8/1977 | Fong | 451/39 |
| 5,445,553 | A | * | 8/1995 | Cryer et al. | 451/7 |
| 5,632,150 | A | * | 5/1997 | Henzler | 62/52.1 |
| 6,034,351 | A | * | 3/2000 | Sato et al. | 219/136 |
| 6,695,686 | B1 | * | 2/2004 | Frohlich et al. | 451/102 |
| 6,723,955 | B1 | * | 4/2004 | Thielmann | 219/136 |

FOREIGN PATENT DOCUMENTS

| JP | 59-127978 | * | 7/1984 |
| JP | 3-114676 | * | 5/1991 |
| JP | 5-269668 | * | 10/1993 |
| JP | 7-314142 | * | 12/1995 |

* cited by examiner

*Primary Examiner*—Kevin P. Kerns
(74) *Attorney, Agent, or Firm*—Jordan and Hamburg LLP

(57) ABSTRACT

A method and a device for cleaning welding torches, for example in automated welding lines, on welding robots and in made-to-order production, by means of a cold medium, preferably $CO_2$ dry ice. According to the method, a compressed air stream, charged with $CO_2$ dry ice is directed constantly or at intervals by a jet nozzle onto one side of the surface to be cleaned and simultaneously describes a rotational movement.

6 Claims, 2 Drawing Sheets

METHOD AND DEVICE FOR CLEANING WELDING TORCHES

BACKGROUND OF THE INVENTION

The invention relates to a method and a device for cleaning welding torches in automatic welding lines, on welding robots and hand-held devices used in fabrication of pieces tailored to specific needs.

There are known several methods for cleaning welding torches. All these methods employ mechanical means of cleaning, using one or more wire brushes, several milling cutters or form cutters.

The disadvantage with such approach is that only the external area and part of the internal area can be cleaned by such kind of tools. Smoke gas deposits are not removed completely from inside the torch, and neither are anti-stick agents that are blown in.

Also, the circular layout of the torch selected due to the necessary rotation of the tools proved disadvantageous as it is an obstacle to the required adaptation of the torch's shape for the actual seam or spot area layout. Any modification in the torch's shape would entail a change of the cleaning appliance.

Another disadvantage is that the originally smooth and mostly nickel-plated surface of the torch undergoes a denudation and becomes rough due to its mechanical processing, which in turn causes an even faster and more intense dirtying of the torch.

BRIEF SUMMARY OF THE INVENTION

The invention is based on the problem of creating both a method and a device for uniform cleaning of welding torches.

According to one aspect of the invention, the problem is solved by a method for cleaning welding torches, for example in automatic fabrication lines, by using a cold mixture of abrasives preferably comprising $CO_2$ pellets plus compressed air or carbon dioxide snow plus compressed air which is blown uniformly or at intervals against the surface to be cleaned.

According to another aspect of the invention, the device used for implementing the method is made up of one or more revolving jet nozzles that are to clean a pre-defined section of the welding torch at a certain angle (to be selected) and the outlet opening which can be fitted with the welding torch's geometry.

In order to have the surfaces cleaned, the air stream that is necessary to transport the abrasive and build up the required kinetic energy is divided into equal or non-equal sub-streams, depending on the number of jet nozzles employed and the size of the sections to be cleaned. Based on the ratio selected, such subdivision is effected by changing the pipe cross section or by combining several regulating valves.

By rotating the jet nozzle and/or directing the air flow out-of-center against the welding torch, an intensive cleaning of the desired section is accomplished. Simultaneously fitting the nozzle outlet in with the seam area will even increase the cleaning effect.

A further development of the invention involves the cold mixture of abrasives to be blown in a pulsed mode. In case of more than one jet nozzle, such pulsation can be simultaneous or alternating.

The advantage of this invention is that using the cold jet technology, in particular the employment of a mixture of $CO_2$ pellets with air, the torches can be cleaned whatever their sizes or shapes are. The $CO_2$ pellets, or the carbon dioxide snow have an impact on limited areas and cause them to cool down and become brittle so as to loosen the dirt and the air stream carries away the loosened dirt from inside and outside the welding torch.

Another advantage of this invention is that by using a cold jet technology no direct contact is made with the welding torch which means that the welding torch's surface may not suffer any denudation or other damages.

An additional advantage of this invention is that several welding torches, being different in shape and size, may be cleaned in one single cleaning station.

BRIEF DESCRIPTION OF THE DRAWINGS

The invention will be described in greater detail by the following two examples.

DETAILED DESCRIPTION OF THE INVENTION

Example 1

Figure 1:
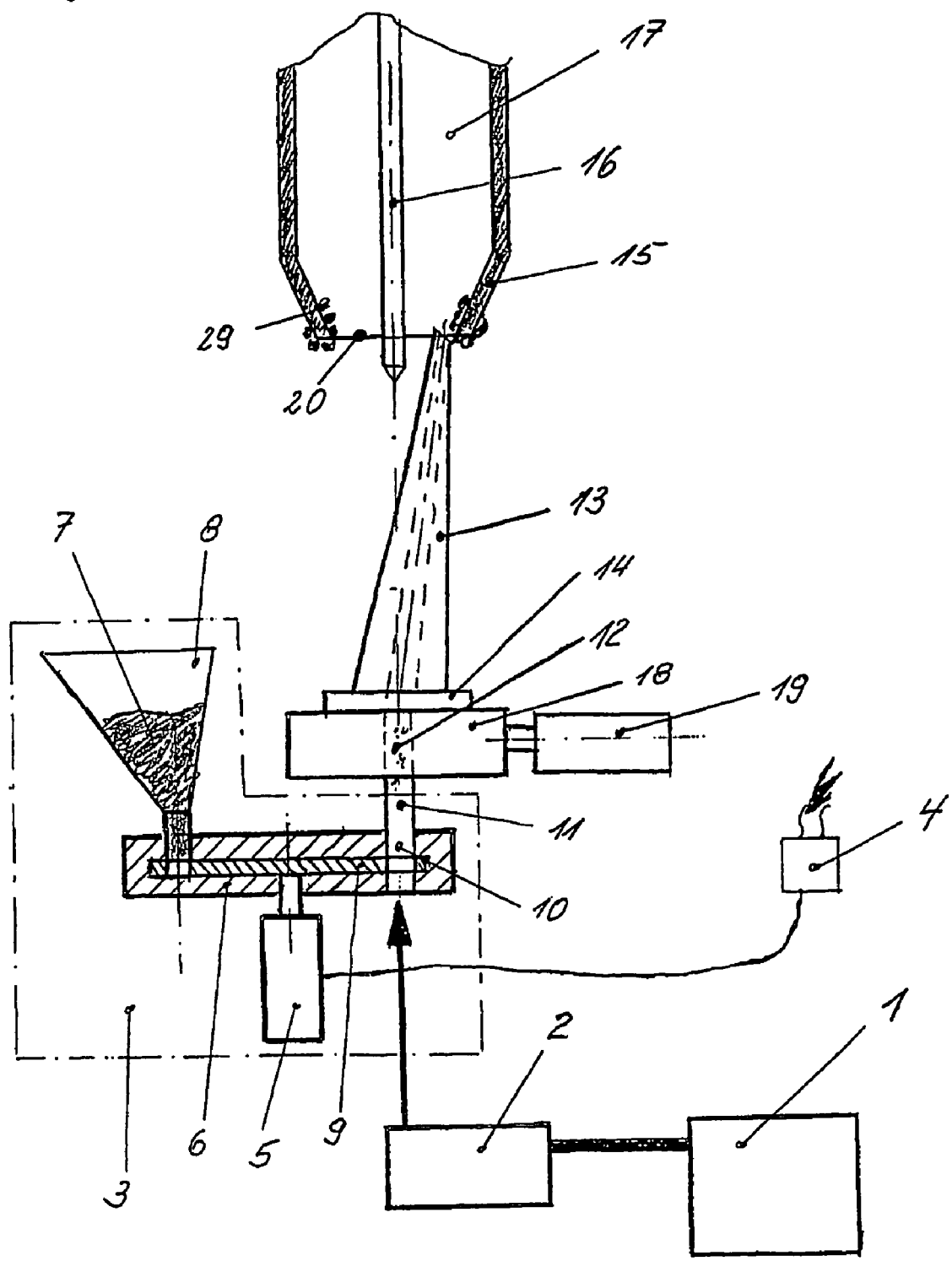
FIG. 1 configuration of a cleaning appliance
Figure 2:
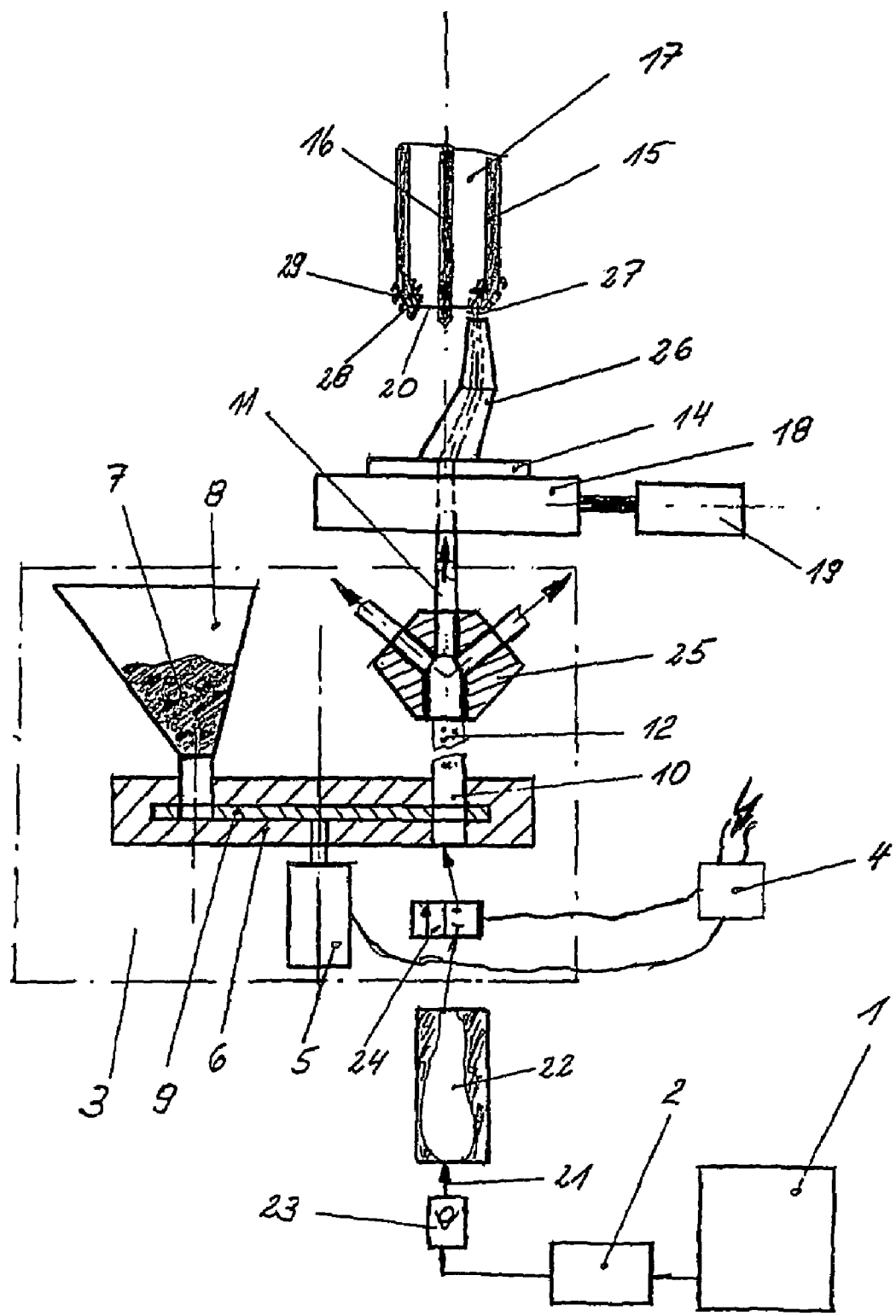
FIG. 2 configuration of a cleaning station for several welding torches with pulse-type mode of cleaning operation

Compressed air supplied by a compressor (1) (not shown in detail) is heated and dried in the treatment station (2) and then guided to the jet cleaning station (3). A contact maker (4) is connected with the welding unit's working program. Approximately two seconds before end of the welding program, the contact maker (4) switches on the driving motor (5) of the proportioning device (6). From the storage bin (8), the $CO_2$ pellets (7) run into the metering disc (9) and by turning the same reach the blasting station (10). In the blasting station (10), the $CO_2$ pellets (7) are metered to the stream of compressed air fed in through the line (11). The stream of compressed air (12) enriched with $CO_2$ pellets is guided to the jet nozzle (13). The jet nozzle (13) is fitted on an adapter (14) and, owing to the specific design of this adapter (14), is shifted out of its vertical position so that the stream of compressed air (12) is directed single-sided onto the area between the shielding gas nozzle (15) and the electrode (16) of the welding torch (17). The rotary transmission (18) is driven by the motor (19) and allows the jet nozzle (13) to rotate covering the entire ring section (20) between the gas nozzle shield (15) and the electrode (16). The $CO_2$ pellets (7) carried by the stream of compressed air (12) cause the deposited dirt (29) to cool down, and owing to the thermal tension built up between shielding gas nozzle (15) and dirt (29) the latter is chipping off from the gas nozzle shield (15).

Example 2

Compressed air supplied by the compressor (1) is heated and dried in the treatment station (2) and then fed through the line (21) into the storage capacity (22), which has the non-return valve (23) fitted upstream. Downstream, the storage capacity (22) is equipped with the valve (24) which is controlled by the contact maker (4). The driving motor (5) is triggered by the contact maker (4) and sets the metering disc (9) of the proportioning device (6) into a rotational motion. After a pre-selected time interval the valve (24) opens. In the blasting station (10), the outflowing compressed air is loaded with the $CO_2$ pellets (7). The stream of compressed air (12) enriched with $CO_2$ pellets is fed into a distributor (25), inside which the stream of compressed air (12) is apportioned in accordance with the number of angled jet nozzles (26) employed. The angled jet nozzles (26) are fitted on the adapter (14) where the rotary transmission (18) and the motor (19) set them into a rotational motion. The sub-stream of compressed air (27) enriched with $CO_2$ pellets is targeted out-of-center on a certain area of the ring section (20) and onto the external areas (28) of the shielding gas nozzle (15). Owing to the rotational motion of the rotary transmission (18) the angled jet nozzle (26) is guided so as to cover the entire ring section (20).

| List of reference numbers | |
|---|---|
| 1 | compressor |
| 2 | treatment station |
| 3 | jet cleaning station |
| 4 | contact maker |
| 5 | driving motor |
| 6 | proportioning device |
| 7 | $CO_2$ pellets |
| 8 | storage bin |
| 9 | metering disc |
| 10 | blasting station |
| 11 | line |
| 12 | stream of compressed air |
| 13 | jet nozzle |
| 14 | adapter |
| 15 | shielding gas nozzle |
| 16 | electrode |
| 17 | welding torch |
| 18 | rotary transmission |
| 19 | motor |
| 20 | ring section |
| 21 | line |
| 22 | storage capacity |
| 23 | non-return valve |
| 24 | valve |
| 25 | distributor |
| 26 | angled jet nozzle |
| 27 | sub-stream of compressed air |
| 28 | external area |
| 29 | dirt |

The invention claimed is:

1. Method for cleaning a welding torch, comprising directing by means of at least one jet nozzle a cold abrasive comprising a stream of compressed air in which $CO_2$ particles are entrained against a predetermined area of the torch to be cleaned while rotating the at least one jet nozzle around an axis of symmetry of the welding torch so that a complete cleaning coverage of the area to be cleaned is achieved.

2. Method according to claim 1, further comprising applying pulsation of intensity to the stream.

3. Method according to claim 1 or 2 wherein the stream of compressed air in which $CO_2$ particles are entrained is apportioned according to the number of jet nozzles employed.

4. Method according to claim 1, wherein the cold abrasive comprises the $CO_2$ pellets or $CO_2$ snow.

5. Apparatus for cleaning a welding torch with an axis of symmetry and having an outer gas nozzle shield and an interior area of the torch, which is to be cleaned, said apparatus comprising:

a source of $CO_2$ particles;

a source for a stream of compressed air;

means for feeding the $CO_2$ particles into the stream of compressed air in order to entrain the $CO_2$ particles in the stream;

at least one jet nozzle having discharge ends, for directing the stream of compressed air with the $CO_2$ particles entrained therein and means for rotating the at least one jet nozzle around said axis, wherein said discharge ends of the at least one jet nozzle are inclined relative to said axis in order to aim the stream at said interior area to clean said interior area by with said stream as the at least one jet nozzle rotates about said axis.

6. Apparatus for cleaning a welding torch with an axis of symmetry and having an outer gas nozzle shield and an interior area and an exterior area of the torch, which are to be cleaned, said apparatus comprising:

a source of $CO_2$ particles;

a source of a stream of compressed air;

means for feeding the $CO_2$ particles into the stream of compressed air in order to entrain the $CO_2$ particles in the stream;

at least one jet nozzle having discharge ends, for directing the stream of compressed air with the $CO_2$ particles entrained therein; and means for rotating the at least one jet nozzle around said axis, wherein said discharge ends of the at least one jet nozzle are substantially parallel to said axis in order to aim the stream at said interior and exterior areas to clean said interior and exterior areas with said stream as the at least one jet nozzle rotates about the axis.

* * * * *